Oct. 9, 1956 J. BOLSEY 2,766,387
AUTOMATIC TRACKING APPARATUS FOR CAMERAS AND THE LIKE
Filed Nov. 14, 1952

INVENTOR.
Jacques Bolsey
BY

United States Patent Office 2,766,387
Patented Oct. 9, 1956

2,766,387

AUTOMATIC TRACKING APPARATUS FOR CAMERAS AND THE LIKE

Jacques Bolsey, New York, N. Y.

Application November 14, 1952, Serial No. 320,404

2 Claims. (Cl. 250—203)

The present invention relates to a tracking apparatus and in particular to an automatic tracking means which is adapted to automatically maintain a camera or the like sighted upon a predetermined subject irrespective of the movement of the camera and subject with respect to each other.

At the present time it is necessary to provide an airplane with several cameras for following a projectile and target, and such a conventional apparatus is quite bulky, elaborate and expensive. After a projectile, such as a rocket or the like, is launched, the airplane changes its direction suddenly and at such a speed that the target and projectile are rapidly out of sight of the camera.

One of the objects of the present invention is to provide an apparatus for automatically registering the direction of movement of a camera out of sight of the subject being photographed and automatically moving the camera in an opposite direction back into sight of the subject.

A further object of the present invention is to provide an automatic tracking apparatus of the above type which is of a fairly small and inexpensive construction and which is capable of keeping a single camera sighted on a subject, while the latter and the camera move with respect to each other.

An additional object of the present invention is to provide a photo-electric tracking means for registering the direction of movement of a camera out of sight with a subject being photographed.

Another object of the present invention is to provide a means for mounting a photo-electric tracking means so as to be sensitive to a movement of a camera out of sight of the subject being photographed.

The objects of the present invention also include the provision of an additional light generating source both at the head and tail ends of projectiles, such as rockets or the like, so as to increase the luminosity of such projectiles so that they register more positively on a photo-electric cell.

With the above objects in view, the present invention mainly consists of a tracking apparatus for automatically maintaining a camera sighted upon a predetermined luminous subject, this apparatus including a camera carried by a universal joint for movement in all directions and a moving means connected to the camera for moving the same in all directions. A photo-electric means is connected to the camera for registering a movement of the camera out of sight of the subject being photographed, and an actuating means interconnects the photo-electric means with the moving means for automatically actuating the latter to move the camera back into sight of the subject being photographed when the photo-electric means registers a movement of the camera out of sight of the subject being photographed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
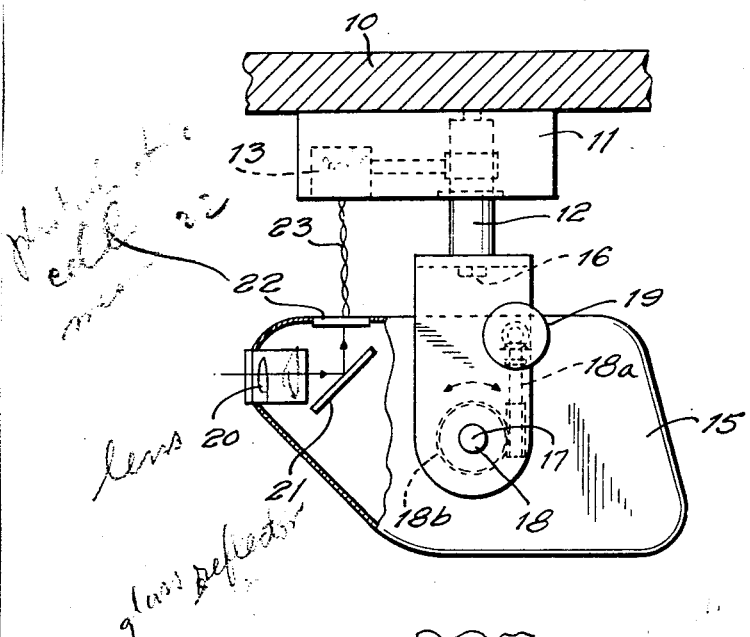
Fig. 1 is a diagrammatic, elevational view of one possible apparatus constructed in accordance with the present invention.

Referring now to the drawings, there is shown in Fig. 1 a stationary support 10, forming part of an airplane, for example, which carries a casing 11 which encloses a motor 13 whose shaft is connected by worm gearing or the like to an elongated rigid part 12 of a universal joint turnably mounted in a suitable bearing in casing 11 for turning movement about a predetermined axis, which may, for example, be vertical when the airplane is horizontal.

A camera 15 is turnably mounted at its center of gravity on a yoke member 16, fixed to the part 12, for movement about an axis 17 normal to the turning axis of part 12 and being horizontal, for example, when the airplane is horizontal, so that the parts 12 and 16 form a universal joint for supporting the camera for movement in all directions. The camera 15 is supported on the legs of yoke 16 by pins 18 extending through openings of this member 16, and one of these pins 18 is fixedly connected to a worm wheel 18b which is turned by a worm on the end of shaft 18a to turn the pins 18 and the camera 15 therewith about the axis 17. Shaft 18a is turned by gearing from motor 19 located on an arm of yoke 16.

The camera 15 includes a lens 20 and a plano-parallel glass plate reflector 21 located behind the lens 20 to intercept a part of the light traveling through the same and directing this light by reflection to the photo-electric cell means 22 which is connected by wiring 23 to the circuit in which the motors 13 and 19 are located for automatically actuating these motors when the photo-electric means 22 registers a movement of the camera 15 out of sight of the subject.

Figure 2:
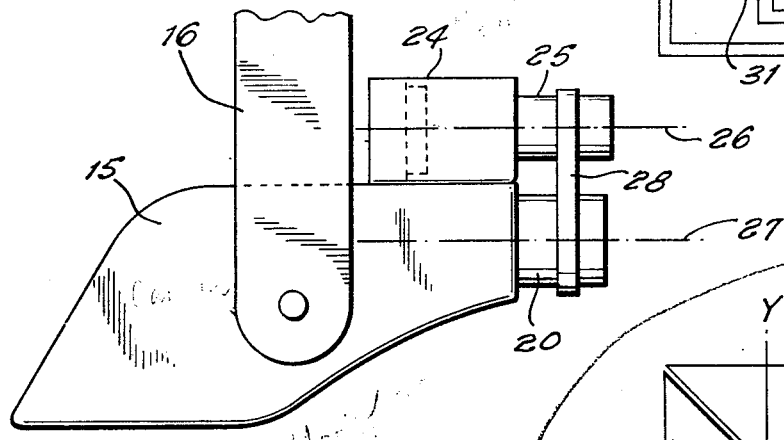
Fig. 2 is a diagrammatic, elevational view of another possible apparatus constructed in accordance with the present invention.

Another photo-electric arrangement for registering the movement of the camera 15 out of sight of the subject is illustrated in Fig. 2 where the camera 15 is mounted on a universal joint and moved in the same way as was described above in connection with Fig. 1. In the apparatus of Fig. 2, a photo-electric cell means 24 forms a unit with an adjustable lens 25, this unit being mounted on top of the camera 15 with the optical axis 26 of lens 25 parallel to the optical axis 27 of lens 20, these two lenses having the barrels thereof interconnected by a member 28 so that when required the lens 25 is automatically focused with the lens 20. The distance between the optical axes 26 and 27 is so small, as compared to the distance from the subject to the camera, that for all practical purposes the optical axes 26 and 27 may be considered coincident with each other.

Figure 3:
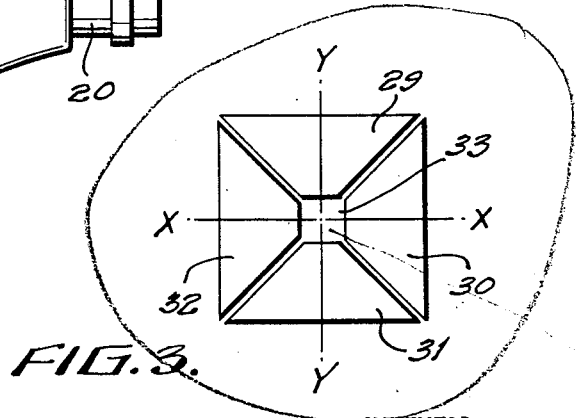
Fig. 3 shows another possible arrangement of photo-electric cells usable with the construction of Figs. 1 and 2.

Fig. 3 illustrates one possible arrangement of the photo-electric cells of the photo-electric means 22 or 24. In the arrangement shown in Fig. 3, four photo-electric cells 29, 30, 31 and 32 are located next to each other about a free area 33 through which the light from the lens 20 or 25 passes when the camera 15 is sighted on the subject. When the camera moves out of sight of the subject, the light will strike one of the photo-electric cells 29—32 to actuate the motors for turning the camera in such a direction that the light will again pass through the area 33 so that the camera will again be sighted on the subject. It will be seen that the four photo-electric cells 29—32 are separated from each other along perpendicular straight lines spaced 45° from the straight lines X and Y which are normal to each other and intersect each other at the center of the area 33.

Figure 4:
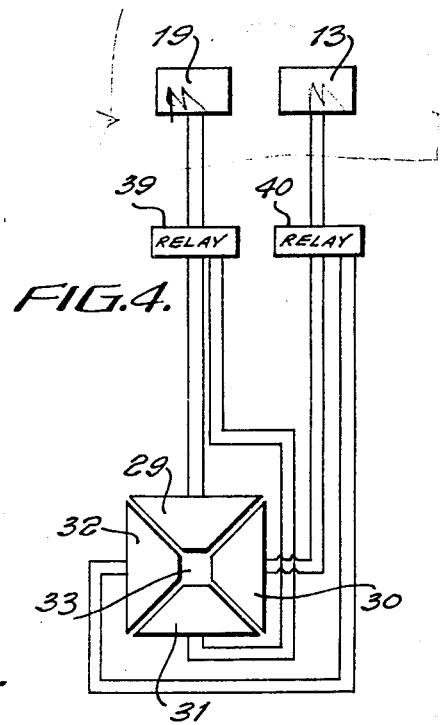
Fig. 4 diagrammatically, illustrates the wiring connection between a photo-electric cell arrangement similar to that of Fig. 3, and a means for automatically moving the camera.

The basic wiring diagram of the apparatus is shown in Fig. 4. As may be seen from Fig. 4 pairs of wires extend from photo-electric cells 29 and 31 to the relay assembly 39 which is in turn connected to the motor 19 for reversibly driving the same for turning the camera 15 about the horizontal axis 17. If the photo-electric cell 29 is energized, motor 10 automatically turns the camera in the direction which moves cell 31 toward the beam on cell 29 until cell 29 is no longer energized, and the photo-electric cell 31, when energized, operates in the same way to turn the camera 15 in an opposite direction. The photo-electric cells 30 and 32 are connected to a relay assembly 40 which reversibly operates the motor 13 for turning the camera about the vertical axis of part 12. When the photo-electric cell 30 is energized, the camera will be turned in that direction about the axis of part 12 which moves the photo-electric cell 32 toward the light beam, and the reverse operation takes place when photo-cell 37 is energized.

If desired, the motors 13 and 19 may be of the type known as Selsyn motors.

It will be understood that each of the elements described above, or two or more together, may also find a useful application, in other types of tracking apparatus for keeping a device sighted on a subject differing from the types described above.

While the invention has been illustrated and described as embodied in automatic tracking apparatus for automatically maintaining a camera sighted on a subject during movement of the subject and the camera with respect to each other, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A tracking apparatus for automatically maintaining a camera sighted on a predetermined luminous subject, comprising, in combination, a camera; universal joint means supporting said camera for turning movement in all directions; moving means connected to said camera for moving the same in all directions; reflector means mounted in said camera for directing a part of the light passing through the lens thereof along a predetermined path; photoelectric means connected to said camera at said predetermined path for receiving light from said reflector means and registering the direction of movement of said camera out of sight of the subject being photographed; and actuating means interconnecting said photoelectric means and said moving means for automatically actuating the latter to move said camera in a direction opposite to said direction of movement back into sight of the subject being photographed when said photoelectric means registers a movement of said camera out of sight of the subject being photographed.

2. A tracking apparatus for automatically maintaining a device sighted upon a predetermined subject, comprising, in combination, universal joint means supporting the device for turning movement in all directions; moving means connected to the device for moving the same in all directions; photoelectric means connected to the device for registering the direction of movement of the same out of sight of a predetermined subject, said photoelectric means comprising a plurality of photoelectric cells located next to each other about a predetermined free area through which a light beam passes when the device is properly sighted, so that when the device moves away from the light beam the latter falls on one of said photoelectric cells; and actuating means interconnecting said photoelectric means and said moving means for automatically actuating the latter to move the device in a direction opposite to said direction of movement back into sight of the object when said photoelectric means registers a movement of the device out of sight of the subject.

References Cited in the file of this patent

UNITED STATES PATENTS

| | | |
|---|---|---|
| 1,747,664 | Droitcour | Feb. 18, 1930 |
| 2,027,393 | McCreary | Jan. 14, 1936 |
| 2,070,178 | Pottenger et al. | Feb. 9, 1937 |
| 2,403,023 | Reynolds | July 2, 1946 |
| 2,403,387 | McLennan | July 2, 1946 |
| 2,604,601 | Menzel | July 22, 1952 |